United States Patent
Le Roux et al.

(10) Patent No.: US 8,379,511 B2
(45) Date of Patent: Feb. 19, 2013

(54) SYSTEM FOR SECURING THE ACCESS TO A DESTINATION IN A VIRTUAL PRIVATE NETWORK

(75) Inventors: Jean-Louis Le Roux, Lannion (FR); Bruno Decraene, Vanves (FR); Estelle Transy, Paris (FR)

(73) Assignee: France Telecom, Paris (FR)

( * ) Notice: Subject to any disclaimer, the term of this patent is extended or adjusted under 35 U.S.C. 154(b) by 633 days.

(21) Appl. No.: 12/442,889

(22) PCT Filed: Sep. 24, 2007

(86) PCT No.: PCT/FR2007/052000
§ 371 (c)(1),
(2), (4) Date: Mar. 25, 2009

(87) PCT Pub. No.: WO2008/037918
PCT Pub. Date: Apr. 3, 2008

(65) Prior Publication Data
US 2010/0008220 A1    Jan. 14, 2010

(30) Foreign Application Priority Data
Sep. 25, 2006   (FR) ..................................... 06 53923

(51) Int. Cl.
*G06F 11/00*    (2006.01)

(52) U.S. Cl. ........................................ 370/216; 370/221
(58) Field of Classification Search .................. 370/216, 370/217, 225–228, 242, 351, 389; 709/238, 709/239, 242
See application file for complete search history.

(56) References Cited

U.S. PATENT DOCUMENTS

| | | | |
|---|---|---|---|
| 6,891,793 B1 * | 5/2005 | Suzuki et al. | 370/217 |
| 7,039,005 B2 * | 5/2006 | Jenq et al. | 370/217 |
| 7,120,118 B2 * | 10/2006 | Rajagopal et al. | 370/237 |
| 7,120,151 B1 * | 10/2006 | Ginjpalli et al. | 370/395.1 |
| 7,197,008 B1 * | 3/2007 | Shabtay et al. | 370/218 |
| 7,269,132 B1 * | 9/2007 | Casey et al. | 370/219 |
| 7,283,465 B2 * | 10/2007 | Zelig et al. | 370/219 |
| 2002/0163889 A1 * | 11/2002 | Yemini et al. | 370/238 |
| 2004/0114595 A1 * | 6/2004 | Doukai | 370/389 |
| 2005/0111351 A1 | 5/2005 | Shen | |

(Continued)

FOREIGN PATENT DOCUMENTS

| | | |
|---|---|---|
| EP | 1 111 860 | 6/2001 |
| EP | 1 318 648 | 6/2003 |

OTHER PUBLICATIONS

R. Bless et al., "Fast Scoped Rerouting for BGP", The 11$^{th}$ IEEE Int'l. Conference on Sep. 28-Oct. 1, 2003, Piscataway, N.J., USA, pp. 25-30.

*Primary Examiner* — Hassan Kizou
*Assistant Examiner* — Roberta A Shand
(74) *Attorney, Agent, or Firm* — Knobbe Martens Olson & Bear LLP

(57) ABSTRACT

A system for securing the access to a destination of a virtual private network (VPNA) connected to a nominal access router (PE3) includes at least one core router (P2) adapted to: detect a failure affecting communication with the nominal access router (PE3); and switch the traffic to a protector access router (PE6) in a back-up tunnel bypassing the nominal access router (PE3). The protector access router (PE6) is adapted: to replace, in an MPLS packet, a nominal VPN label specific to the nominal access router (PE3) by a back-up VPN label specific to a back-up access router (PE4) connected to that destination; and to redirect said packet to the back-up access router (PE4) in a tunnel bypassing the nominal access router (PE3).

10 Claims, 1 Drawing Sheet

U.S. PATENT DOCUMENTS

| | | | |
|---|---|---|---|
| 2006/0013232 A1* | 1/2006 | Xu et al. | 370/396 |
| 2006/0153067 A1 | 7/2006 | Vasseur | |
| 2006/0193248 A1* | 8/2006 | Filsfils et al. | 370/216 |
| 2006/0198321 A1* | 9/2006 | Nadeau et al. | 370/254 |
| 2006/0209682 A1 | 9/2006 | Filsfils et al. | |
| 2006/0291378 A1* | 12/2006 | Brotherston et al. | 370/221 |

* cited by examiner

SYSTEM FOR SECURING THE ACCESS TO A DESTINATION IN A VIRTUAL PRIVATE NETWORK

RELATED APPLICATIONS

This is a U.S. National Phase Application under 35 USC §371 of International Application PCT/FR2007/052000, filed on Sep. 24, 2007.

This application claims the priority of French application no. 06/53923 filed on Sep. 25, 2006, and the content of which is hereby incorporated by reference.

BACKGROUND OF THE INVENTION

The field of the invention is that of telecommunications and more particularly that of virtual private networks (VPN).

The context of the invention is that of a level 3 VPN consisting of core routers (P), access routers (PE), and client routers (CE), using the MPLS VPN technology defined in the Internet Engineering Task Force (IETF) document Request For Comments (RFC) 4364.

The MPLS VPN technology is not described here. For more information on this technology see the above document RFC 4364.

Some VPN communications services have high demands in terms of CE to CE availability (for example voice (VoIP) and telemedicine services). These services require deterministic rerouting within less than 100 milliseconds (ms) in the event of a failure affecting a link or a node. At present, the only technology providing such rerouting performance is the Fast Reroute technology that sets up in advance local back-up paths bypassing the protected element. In the event of a failure, the directly upstream node updates its routing table and switches the traffic to the back-up path. This method requires no route calculation or signaling after the failure. Moreover, the back-up routes are preinstalled in the switching tables of the routers, which guarantees a determinist rerouting time of less than 100 ms.

There are two protection modes:
the MPLS Fast Reroute mode based on setting up end-to-end MPLS-TE primary tunnels locally protected by MPLS-TE back-up tunnels, described in the IETF document RFC 4090;
the IP Fast Reroute mode based on protecting IP routes by back-up routes bypassing the protected element and with no risk of loop. These back-up routes can be in connected mode with local back-up MPLS-TE tunnels or in non-connected mode if there is no risk of loop. For more details of this second mode see the following documents:
Shen, Pan, "Nexthop Fast ReRoute for IP and MPLS" (http://www.potaroo.net/ietf/all-ids/draft-shen-nhop-fastreroute-01.txt); and
Shand, Bryant, "IP Fast Reroute Framework", http://www.ietf.org/internet-drafts/draft-ietf-rtgwg-ipfrr-framework-05.txt.

A tunnel is a virtual connection in which a packet conforming to a given protocol (e.g. IPv4, IPv6, MPLS, etc.) is placed in an external packet conforming to the same protocol or another protocol (e.g. IP, MPLS, etc.) to transport it from one point to another. In this tunnel mechanism, the network equipments situated between the entry point of the tunnel and its exit point process and are aware only of the external packet, not the internal packet.

With meshing of the PEs by MPLS-TE primary tunnels, the MPLS Fast Reroute mode protects PE-P and P-P links and P nodes. It is difficult to scale up because it requires meshing of all the PEs and therefore requires a number of tunnels proportional to the square of the number of PEs. It is therefore applicable in practice only to a small number of PEs (approximately 100).

The IP Fast Reroute mode protects CE-PE, PE-P, and P-P links and P nodes. It requires no MPLS-TE primary tunnels and is therefore more readily scaled up.

The current Fast Reroute techniques described above provide no protection for access routers of an MPLS-VPN network.

The MPLS Fast Reroute technique cannot protect the access routers because this would require starting up the MPLS-TE tunnels on the CEs.

At present there is no mechanism for implementing MPLS-TE between two client routers.

Moreover, even if such a mechanism were defined, it would have limitations in terms of scaling up because it would require a number of tunnels proportional to the square of the number of client routers, and would therefore in practice be applicable only to a very small number of client routers.

Moreover, the IP Fast Reroute technique provides no protection for access routers because, for the core router that triggers the Fast Reroute process, the destination is the access router, so that if the access router were to disappear there would no longer be a destination.

Moreover, even if the core router were advised of a back-up access router for backing up a nominal access router, the back-up access router could not process the VPN packets because it would not know the correct context for processing them.

The core router would switch the traffic from a nominal access router to a back-up access router without changing the VPN label (because it would not know it).

But, VPN labels are allocated locally by the access routers and have only a local meaning, and so the traffic would be routed to a bad VPN on the back-up access router.

Access routers are particularly sensitive, and have a high workload (maintaining and updating VPN tables); statistics show that they fail frequently.

The only back-up mechanisms against router access failure available at present rely on convergence of the Border Gateway Protocol (BGP), with back-up times exceeding one second, which is not compatible with the availability demands of real-time services.

To achieve good availability at the client router to client router level it is therefore crucial to define new mechanisms for quickly protecting access routers able to support a large number of client routers (i.e. scaling up).

OBJECT AND SUMMARY OF THE INVENTION

A first aspect of the invention relates to a system for securing the access to a destination in a virtual private network connected to at least one nominal access router, this system including:
at least one core router adapted to:
detect a failure affecting communication with the nominal access router; and
switch the traffic to a protector access router in a back-up tunnel bypassing the nominal access router;
this protector access router being adapted to:
replace, in an MPLS packet, a nominal VPN label specific to the nominal access router by a back-up VPN label specific to a back-up access router connected to that destination; and
redirect this packet to the back-up access router in a tunnel bypassing the nominal access router.

A second aspect of the invention is directed to a protector access router adapted to be used to secure the access to a destination in a virtual private network in the event of a failure affecting communication with a nominal access router connected to this network. This access router includes:

- means for identifying a nominal VPN label specific to said nominal access router for said destination;
- means for replacing, in this MPLS packet, the nominal VPN label by a back-up VPN label specific to a back-up access router for this destination; and
- means for redirecting the MPLS packet to the back-up access router in a tunnel bypassing the nominal access router.

In a correlated way, the invention is also directed to a routing method usable in a protector access router for securing the access to a destination in a virtual private network in the event of a failure affecting communication with a nominal access router connected to said network, characterized in that it includes:

- a step of receiving an MPLS packet comprising a nominal VPN label specific to said nominal access router for the above-mentioned destination;
- a step of replacing, in said MPLS packet, the nominal VPN label by a back-up VPN label specific to a back-up access router for that destination; and
- a step of redirecting this MPLS packet to the back-up access router in a tunnel bypassing the nominal access router.

The invention enables to protect a site of a virtual private network connected to a nominal access router and to at least one back-up access router.

The mechanism of the invention relies on local protection of a nominal access router by the core routers directly connected to that nominal access router.

In the event of a failure affecting the nominal access router, the protector core router reroutes the VPN traffic to a protector access router able to reroute the traffic in a tunnel that bypasses the nominal access router.

According to a feature of the invention, the nominal access router to be protected must be connected on the upstream side to at least one protector core router able to detect the failure.

The invention has two main embodiments.

In a first embodiment, the core router sends the protector access router in the back-up tunnel information meaning that this back-up tunnel is to be used in the event of the failure affecting the nominal access router.

That information can consist of a specific MPLS label placed before the VPN label.

In this first embodiment, the protector access router of the invention includes:

- means for receiving from the core router via a back-up tunnel information meaning that this back-up tunnel is to be used in the event of the failure; and
- means for creating a contextual MPLS switching table comprising instructions for:
  - replacing, in each MPLS packet received in said back-up tunnel, the nominal label by the back-up label; and
  - switching this MPLS packet to the back-up access router via a second back-up tunnel that bypasses the nominal access router.

In a preferred embodiment of this first variant, the protector access router of the invention comprises means for identifying the back-up access router and obtaining the labels from BGP announcements effected by the access routers. This feature avoids explicit configuration of the access router of the invention to associate a back-up label with a nominal label.

The second embodiment of the invention is particularly advantageous if the core router cannot send information representing the failure in the back-up tunnel. This embodiment advantageously uses a partition of the VPN label space.

As mentioned above, the VPN labels are allocated locally by the access routers and have only a local meaning.

According to a feature of the invention, to avoid VPN label collisions, each access router allocates its VPN labels with values that are specific to it, with the result that the labels of a protector access router and of all the nominal access routers protected by that protector access router are different.

In one particular variant of this second embodiment, the label space is partitioned between the protector access router, the nominal access router that it protects, and the back-up access router.

In this second embodiment, the protector access router retains in its switching table (MPLS table) the nominal VPN label reserved by the nominal access router for a given destination and pointing indirectly to the corresponding back-up access router with the back-up VPN label reserved by the back-up access router for this destination.

The back-up access router finally routes the traffic to the correct destination site.

In one particular embodiment of this second variant, the protector access router of the invention comprises means for identifying the back-up access router and obtaining the labels from the BGP announcements effected by the access routers.

This feature avoids explicit configuration of the access router of the invention to associate a back-up label with a nominal label.

During failure of the nominal access router, a protector access router protecting the nominal access router receives the traffic whose initial destination was a nominal access router with the VPN labels announced by that nominal access router for the destination sites situated beyond that nominal access router.

It is responsible for rerouting traffic flows to the corresponding back-up access router or routers with the VPN label announced by the back-up access routers for those destination sites.

A protector access router knows all the nominal access routers that it protects either through the configuration process or through an automatic discovery process.

A nominal access router and its back-up access routers announce in BGP a set of destinations that can be reached and the corresponding VPN labels.

The announcement by an access router of an IP address "D" in a VPN V identified by a Route Target "RT_V", with the VPN label L is written (access router, RT_V, D, L).

For a given VPN (i.e. a given RT), the nominal access routers and the back-up access router must use a different BGP Route Distinguisher (RD) in each access router in order for any use of a BGP Route Reflector not to conceal the back-up route to the protector access router.

In one particular variant, the steps of the above routing method are determined by computer program instructions.

Consequently, the invention is also directed to a computer program on an information medium, adapted to be executed in a computer, and including instructions adapted to execute the steps of at least one routing method as described above.

This program can use any programming language and take the form of source code, object code or an intermediate code between source code and object code, such as a partially compiled form, or any other desirable form.

Another aspect of the invention is directed to a computer-readable information medium comprising instructions of the above computer program.

The information medium can be any entity or device capable of storing the program. For example, the medium can include storage means, such as a ROM, for example a CD ROM or a microelectronic circuit ROM, or magnetic storage means, for example a diskette (floppy disk) or a hard disk.

In contrast, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit incorporating the program, the circuit being adapted to execute the method in question or to be used in its execution.

BRIEF DESCRIPTION OF THE DRAWINGS

Other features and advantages of the present invention emerge from the following description given with reference to the appended drawings, which show one non-limiting embodiment of the invention. In the figures.

DETAILED DESCRIPTION OF A FIRST EMBODIMENT

Figure 1:
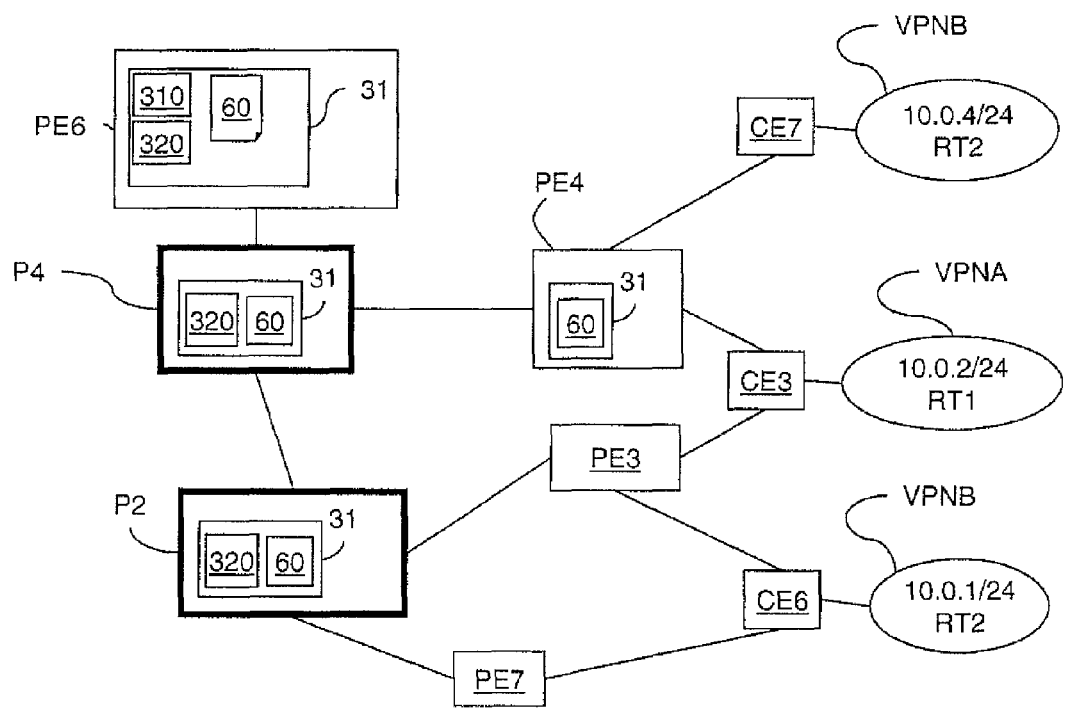
FIG. 1 represents a system of a preferred embodiment of the invention for securing the access to a site in a virtual private network.

FIG. 1 represents two virtual private networks (VPN) VPNA and VPNB.

These virtual private networks are identified absolutely by a respective unique identifier (Route Target) RT1, RT2.

The virtual private network VPNA can be accessed via a client router CE3.

Locally, as seen from this client router CE3, the virtual private network VPNA corresponds to the IP address range 10.0.2/24.

The virtual private network VPNB can be accessed via two client routers CE6 and CE7.

Locally, as seen from the client router CE6 (respectively CE7), the virtual private network VPNB corresponds to the IP address range 10.0.1/24 (respectively 10.0.4/24).

This figure shows:
four access routers PE3, PE4, PE6, and PE7 adapted to implement the Border Gateway Protocol (BGP); and
two core routers P2 and P4 adapted to implement the Interior Gateway Protocol (IGP).

With each of these access routers and each access route to a VPN the invention associates an identifier RD (Route Distinguisher) specific to that access router and that VPN.

In the present example, these identifiers are as follows:

| Access router | VPN | RD |
|---|---|---|
| PE4 | VPNA | RD1 |
| PE4 | VPNB | RD2 |
| PE3 | VPNA | RD3 |
| PE3 | VPNB | RD4 |
| PE7 | VPNB | RD5 |

In the present example, each access router has in its non-volatile configuration memory 31 a configuration file 60 in which this association is stored.

For example, the configuration file 60 of the access router PE4 comprises the following instruction:
VRFA: RD1, VRFB: RD2
in which VRFA and VRFB represent the IP level VRF (Virtual Routing and Forwarding Table) routing tables respectively associated with the virtual private networks VPNA and VPNB.

According to the invention, disjoint label spaces are configured in each of the access routers PE3, PE4, PE6, and PE7.

In the present example, the label spaces are as follows:

| Access router | Label space |
|---|---|
| PE3 | [101-200] |
| PE4 | [201-300] |
| PE6 | [401-500] |
| PE7 | [301-400] |

In the present example, the label space is stored in the configuration file 60 of the access router concerned.

For example, the configuration file 60 of the access router PE3 includes the expression:
PE3 Config: VPN Label Space 101-200

In the present example, the access routers connected to at least one client router CE3, CE6, CE7 are the access routers PE3, PE4, and PE7.

Using the Border Gateway Protocol, each access router announces to the other access routers the labels to be used to reach a particular VPN. This is known in the art.

For example, the access router PE3 broadcasts the announcement:
Announce 10.0.2/24 RT1 label 101 to oblige all the other access routers to use the label 101 to reach the virtual private network VPNA corresponding to the IP address range 10.2.24 with the unique identifier (Route Target) RT1.

In the present example, it is a question of protecting the access router PE3 connected to the client routers CE3 and CE6.

In the example described here, the access router PE3 is protected by:
the back-up access routers PE4 and PE7;
the protector access router PE6 of the invention; and
the protector core router P2.

According to the invention, no particular configuration is required at the level of the back-up access routers PE4 and PE7 except for the label ranges.

The process of configuring the protector access router PE6 is described below.

First of all, the access router PE6 is declared as the protector access router for the access router PE3.

In the embodiment described here, this step consist in adding the following instruction to the configuration file 60 of the access router PE6:
Config: Protecting PE3

Thereafter the protector access router PE6 receives BGP announcements sent by the other access routers PE3, PE4, and PE7.

In order to be able to implement the rerouting function, the protector access router PE6 installs the VPN labels announced by all the access routers PE3, PE4, and PE7 in a BGP table 310 of its volatile configuration memory 31.

Assume that the VPN routes received by the protector access router PE6 during the step E20 are:

| Access router | Destination     | VPN label |
|---------------|-----------------|-----------|
| Receive: PE4  | 10.0.2/24 RT1 RD1 | label 201 |
| Receive: PE4  | 10.0.4/24 RT2 RD2 | label 202 |
| Receive: PE3  | 10.0.2/24 RT1 RD3 | label 101 |
| Receive: PE3  | 10.0.1/24 RT2 RD4 | label 102 |
| Receive: PE7  | 10.0.1/24 RT2 RD5 | label 301 |

Each time that it receives an announcement from the access router PE3, the protector access router PE6 identifies the destination to be protected.

Here it determines that the following destinations are to be protected:

| Destination |
|-------------|
| 10.0.2/24 RT1 |
| 10.0.1/24 RT2 |

For each of these two destinations, the protector access router PE6 looks up in the table 310 the same announcement by another access router with the same destination (IP range and Route Target).

The route identifier RD is not taken into account.

In the present example:
1) only the first route from the table 310 is a candidate for the first destination: 10.0.2/24 RT1.

| Access router | Destination     | VPN label |
|---------------|-----------------|-----------|
| Receive: PE4  | 10.0.2/24 RT1 RD1 | label 201 |

2) only the fifth route from the table 310 is a candidate for the second destination: 10.0.1/24 RT2.

| Access router | Destination     | VPN label |
|---------------|-----------------|-----------|
| Receive: PE7  | 10.0.1/24 RT2 RD5 | label 301 |

If more than one line of the table is a candidate, during this look-up step E30 the method of the invention uses a decision sub-step in order to retain only one route.

Announcement look-up is followed by updating the MPLS switching table 320.

The result of this updating step is given below:

| Substitution labels | Back-up access router | Action   |
|---------------------|-----------------------|----------|
| 101 -> 201          | PE4                   | (24, P4) |
| 102 -> 301          | PE7                   | (26, P4) |

For example, the first line of the switching table 320 indicates that if the protector access router PE6 receives a frame with the VPN label 101 it must:
replace that label by the back-up VPN label 201; and
to reach the back-up router PE4, send the traffic to PE4 in the tunnel T2, i.e. effect a PUSH 24 and send the frame to the core router P4.

The person skilled in the art will understand that the switching table of the core router P4 includes a complementary record:
24 (PE4)->pop, PE4
with the result that, on reception of the frame received from the protector access router PE6, the core router P4 unstacks the value 24 and sends the frame to the back-up router PE4.

Similarly, the second line of the switching table 320 indicates that if the protector access router PE6 receives a frame with the VPN label 102 it must:
replace that label by the back-up VPN label 301; and
to reach the back-up router PE7, send the traffic to PE7 in the tunnel T3, i.e. effect a PUSH 26 and send the frame to the core router P4.

In the embodiment described here, the tunnels T2 and T3 to the back-up routers PE4, PE7 are set up using the LDP.

The above operations are carried out on each change of information that might modify the BGP routing.

During this updating of the switching table, it is verified that the tunnels T2 and T3 do not pass through the nominal access router PE3 that is to be protected.

According to the invention, the core router P2 is configured as a protector core router. To this end, the configuration file 60 of the core router P2 comprises the following instruction:
Config: Link P2-PE3: PE Protector=PE6.

The switching table 320 of the core router P2, using a known format, is as follows:

| 26 | (PE4)            | -> | 24,  | P4  |
|----|------------------|----|------|-----|
| 30 | (PE7)            | -> | pop, | PE7 |
| 31 | (PE6)            | -> | 27,  | P4  |
| 23 | (PE3)            | -> | pop, | PE3 |
|    | (PE3 back-up PE6)| -> | 27,  | P4  |

According to the invention, the protector core router P2 maintains two outputs for the destination PE3 (on the fourth and fifth lines, respectively):
a nominal output to PE3; and
a back-up output to the protector access router PE6 via the back-up tunnel T1 that bypasses the nominal access router PE3; in the example described here, the tunnel T1 to the protector access router PE6 is set up using the LDP.

Figure 2:
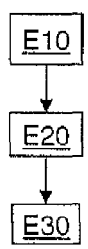
FIGS. 2 and 3 represent in flowchart form particular embodiments of routing methods of the invention.
Figure 3:

The routing method used in the protector router P2 and the routing method of the invention used in the protector access router PE6 are described below with reference to FIGS. 2 and 3.

Under nominal conditions the protector core router P2 sends the traffic whose destination is 10.0.2/24 ... RT1, to the nominal access router PE3 with the nominal VPN label 101 announced by the nominal access router PE3 for that destination.

If a failure occurs on the P2-PE3 link or in the router PE3, the core router P2 detects that failure during a step E10.

Then, during a step E20, the protector core router P2 switches the traffic to the protector access router PE6 protecting the router PE3, retaining the VPN label 101.

During a step F10 of its routing method, the protector access router PE6 detects that the MPLS packet comprises a nominal VPN label reserved by the nominal access router PE3 for the destination 10.0.2 of the virtual private network VPNA.

During a step F20 of its routing method, the access router PE6 replaces, in the MPLS packet received in the preceding step, the nominal VPN label 101 by the back-up VPN label 201 reserved by the back-up access router PE4 for that destination.

Then, during a step F30 of its routing method, the access router PE6 redirects the MPLS packet to the back-up access router PE4.

On reaching the router PE4 the traffic has reached its destination.

The same goes for the destination 10.0.1 of the virtual private network VPNB.

In the above description, the protector access router carries out a MPLS routing to the back-up access routers.

Another option is for the protector access router to create back-up VRF.

VRF (RT_V, nominal access router) is the back-up VRF protecting VPN V (using the RT RT_V) against failures in the nominal access router.

This VRF contains all the VPN routes having an RT "RT_V", excluding routes whose BGP next-hop is "nominal access router".

For each nominal access router, and for each VPN announcement (nominal access router, RT_V, D, LN) by that nominal access router, the protector access router installs the following entry in the MPLS switching table:

LN->look up in the back-up VRF VRF (RT_V, nominal access router).

DETAILED DESCRIPTION OF A SECOND EMBODIMENT

In the first embodiment described above, disjoint label spaces are configured in each of the access routers PE3, PE4, PE6, and PE7.

A second embodiment is described below in which such configuration is not necessary.

In this embodiment, the protected nominal router PE3 defines a label space identified by a contextual label LB inserted before the nominal label 101 in the transfer plan.

The protector access router PE6 informs the protector core router P2 of the contextual label LB to be used in the event of a failure affecting communication with the nominal router PE3.

This contextual label can be sent from the protector access router PE6 to the protector core router P2 by means of a targeted LDP session. An extension of the LDP defined in the IETF document RFC 3036 is necessary for announcing the context, namely the protected nominal router PE3. This announcement can be effected by a new FEC TLV inserted in an LDP LabelMapping message.

In this embodiment, the protector access router PE6 of the invention maintains a contextual MPLS table LFIB for each nominal router to be protected (PE3). This table contains for each destination VPN announced by PE3 the VPN label reserved by the nominal access router (PE3), pointing to a back-up router (PE4) with the VPN label reserved by the back-up router for that destination.

The construction of this table is based on analyzing the BGP information announced by the nominal and back-up access routers. The procedure for constructing this table is identical to that described for the first embodiment, except that here a contextual MPLS table is dedicated to protecting a nominal access router (PE3) and contains only the labels reserved by that access router (thus avoiding the risks of label collision and therefore the partitioning).

For example, the MPLS contextual table associated with this nominal router (PE3) is as follows:

| Substitution labels | Back-up access router | Action |
|---|---|---|
| 101 -> 201 | PE4 | (24, P4) |
| 102 -> 301 | PE7 | (26, P4) |

It maintains also an MPLS main table pointing to the contextual tables. In this main table, the contextual label LB points to the MPLS contextual table LFIB associated with this nominal router (PE3).

During failure of the nominal router PE3, the protector core router P2 re-routes traffic whose destination is the nominal router PE3 in the tunnel T1 to the protector access router PE6, adding the contextual label LB before the VPN label.

In other words, the core router P2 sends the protector access router PE6 in the back-up tunnel T1 information meaning that this back-up tunnel is to be used during failure of the nominal access router PE3.

In the present example, this information consists of a specific MPLS label LB placed before the VPN label.

The protector access router PE6 therefore effects two MPLS look-up operations: a first look-up operation in the MPLS main switching table, using the label LB, in order to identify the MPLS contextual switching table associated with PE3; then a second look-up operation in this contextual table using the nominal VPN label reserved by PE3 (101), in order to determine the back-up VPN label (201) and the back-up access router (PE4).

The invention claimed is:

1. A system for securing the access to a destination in a virtual private network connected to at least one nominal access router, comprising:
at least one core router adapted to:
detect a failure affecting communication with said nominal access router; and switch MPLS packet traffic to a protector access router in a back-up tunnel bypassing the nominal access router;
said protector access router being adapted to:
replace, in an MPLS packet, a nominal VPN label specific to said nominal access router by a back-up VPN label specific to a back-up access router connected to that destination; and
redirect said MPLS packet to said back-up access router in a tunnel bypassing said nominal access router.

2. The system according to claim 1, comprising a partition of the VPN label space between said protector access router, said at least one nominal access router, and said at least one back-up access router.

3. The system according to claim 1, wherein said core router sends said protector access router in said back-up tunnel information meaning that this back-up tunnel is to be used in the event of said failure.

4. A protector access router adapted to be used to secure the access to a destination in a virtual private network in the event of a failure affecting communication with a nominal access router connected to said network, comprising:
means for identifying a nominal VPN label specific to said nominal access router for said destination;
means for replacing, in a MPLS packet, said nominal VPN label by a back-up VPN label specific to a back-up access router for said destination; and means for redirecting said MPLS packet to said back-up access router in a tunnel bypassing said nominal access router.

5. The protector access router according to claim 4, comprising means for installing, in an MPLS switching table, said nominal label specific to said nominal access router for said destination and pointing to the back-up access router with said back-up VPN label specific to that back-up access router for that destination.

6. The protector access router according to claim 4, comprising:
   means for receiving from a core router via a back-up tunnel information meaning that said back-up tunnel is to be used in the event of said failure; and
   means for creating a contextual MPLS switching table comprising instructions for:
   replacing, in each MPLS packet received in said back-up tunnel, said nominal label by said back-up label; and
   switching this MPLS packet to said back-up access router via said tunnel bypassing said nominal access router.

7. The protector access router according to claim 4, comprising means for identifying said back-up access router and obtaining said labels from BGP announcements by said access routers.

8. A routing method usable in a protector access router for securing the access to a destination in a virtual private network in the event of a failure affecting communication with a nominal access router connected to said network, comprising:
   a step of receiving an MPLS packet comprising a nominal VPN label specific to said nominal access router for the destination;
   a step of replacing in said MPLS packet, said nominal VPN label by a back-up VPN label specific to a back-up access router for said destination; and
   a step of redirecting said MPLS packet to said back-up access router in a tunnel bypassing said nominal access router.

9. A process in which a computer executes the instructions set forth in a computer program including instructions for performing the steps of a routing method according to claim 8.

10. A non-transitory computer-readable storage medium storing a computer program including instructions for executing the steps of a routing method according to claim 8.

* * * * *